United States Patent [19]

Janci

[11] 3,813,989

[45] June 4, 1974

[54] METHOD OF POSITIONING THE HEAD OF A MACHINE

[76] Inventor: John Janci, 1125 N. Karlov, Chicago, Ill. 60651

[22] Filed: June 14, 1973

[21] Appl. No.: 369,851

[52] U.S. Cl. ......................... 90/11 R, 90/17, 408/1, 33/185 R, 33/174 S
[51] Int. Cl. ............................................. B23b 1/12
[58] Field of Search ........ 33/185 R, 174 S, 174 TC, 33/174 TA; 408/1, 75, 241; 90/11 C, 17, 11 R, DIG. 12, 11

[56] References Cited
UNITED STATES PATENTS
3,763,570  10/1973  Andersen ........................ 33/185 R

*Primary Examiner*—Gil Weidenfeld
*Attorney, Agent, or Firm*—Bernard L. Kleinke; Leonard J. Kalinowski

[57] ABSTRACT

A method of positioning a generally vertically extending positionally adjustable tool-driving head of a machine, such as a milling machine, at a predetermined direction includes providing a base and fastening it to the head, positioning a flat smooth surface of the table normal to the predetermined direction, freeing the head for lateral movement, and causing relative motion between the base and the table until they engage one another and the base is seated flat against the surface of the table.

4 Claims, 6 Drawing Figures

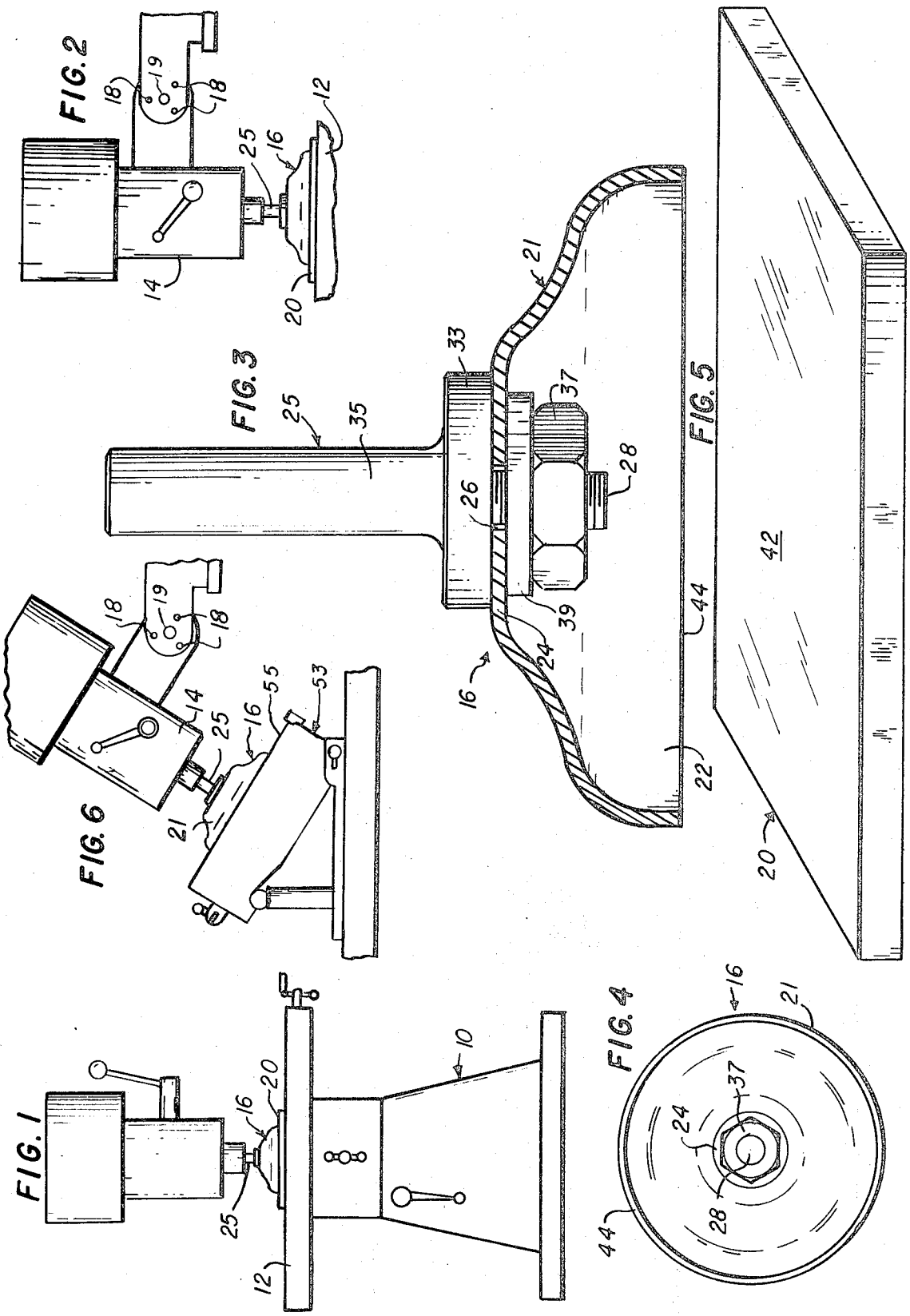

METHOD OF POSITIONING THE HEAD OF A MACHINE

The present invention relates to a method of positioning a tool-driving head of a machine at a predetermined direction, and it more particularly relates to a method of positioning a generally vertically extending head of a milling machine at a predetermined angle relative to its generally horizontally extending table.

Machines, such as milling machines, having generally vertically extending heads mounted over a horizontal table for supporting a workpiece are provided with indicators used to facilitate the positioning of the head in a predetermined direction. The head is adapted to be adjusted positionally in a vertically extending direction normal to the horizontal face of the table or at a predetermined angle displaced from the vertical. While the use of such an indicating mechanism is satisfactory for some applications, the operator must be highly skilled in order to achieve an accurate positioning of the head of the milling machine for precise milling operations. Moreover, such a method of positioning the head is unduly time consuming and tedious, and the indicator mechanism is relatively expensive. Therefore, it would be highly desirable to have a method of positioning quickly and efficiently the head of a machine, such as a milling machine, in a predetermined desired direction in an extremely accurate and precise manner without the use of expensive indicators and without the necessity of being performed by highly trained personnel.

Therefore, the principal object of the present invention is to provide a new and improved means for positioning the head of a machine in a predetermined desired direction and in a fast, accurate and efficient manner.

Another object of the present invention is to provide such a method of positioning the head of a machine without the use of expensive indicators in an extremely fast and accurate manner without the necessity of being performed by highly skilled personnel.

Briefly, the above and further objects are realized in accordance with the present invention by providing a base and fastening it to the tool-driving head of the machine, positioning the plane of a flat smooth surface of the table normal to the desired predetermined direction to be assumed by the head, freeing the head for lateral movement, and causing relative motion between the base and the surface of the table until they engage one another and the base is seated flat against the face of the surface.

The invention, both as to its organization and method of operation, together with further objects and advantages thereof, will best be understood by reference to the following detailed description taken in connection with the accompanying sheet of drawings wherein:

FIG. 1 is a front elevational view of a milling machine in the process of having its head positionally adjusted in accordance with the method of the present invention;

FIG. 2 is a side elevational view of the head portion of the machine of FIG. 1;

FIG. 3 is a vertical cross-sectional view of the base attached to the head of the milling machine of FIG. 1 in accordance with the present invention, the base being detached from the head of the milling machine;

FIG. 4 is a bottom plan view of the base of FIG. 3;

FIG. 5 is a plate used in performing the method of the present invention; and

FIG. 6 is a side elevational view of the head of the milling machine of FIG. 1, illustrating the method of positioning the head at a predetermined angle relative to the vertical.

Referring now to the drawings, and more particularly to FIGS. 1 and 2 thereof, there is shown a machine 10, which in the preferred form of the present invention is a milling machine, having a vertically movable table 12 and a pivotally mounted head 14 extending generally vertically above the table 12. In order to position the head 14 in a predetermined direction, such as a vertical direction normal to the plane of the table top as shown in FIGS. 1 and 2, in accordance with the present invention a cup-shaped base 16 is fastened to the head 14, and as shown in FIG. 2, a plurality of clamp bolts 18 are loosened to free the head for pivotal movement about the point 19. Thereafter, the table 12 is moved upwardly in a conventional manner to cause the base 16 and a plate 20 resting on the table 12 to engage one another and to cause the open mouth of the base to sit flat against the face of the plate 20 of the table, the head 14 pivoting as the table moves upwardly and engages the base 16. Thereafter, the bolts 18 are tightened to retain the head 14 in its adjusted position, and the base 16 is then removed from the head so that a milling cutter tool (not shown) can be attached to the head 12 for performing a milling operation.

Considering now in greater detail the base 16 with reference to FIGS. 3 and 4 of the drawings, the base includes an opened-mouth cup-shaped member 21 which is composed of a suitable rigid material, such as metal. The member 21 is circular in cross-section and is generally in the shape of a hollow hemisphere with a circular open mouth 22 at one end and a flattened surface 24 at its opposite end. In order to enable the cup-shaped member 21 to be secured to the head 14, an elongated member 25 extends from the flattened surface 24 and is adapted to be fixed in place in the head 14 in the same manner as any conventional milling machine cutting tool. A centrally disposed hole 26 in the surface 24 receives an externally threaded rod 28 which depends from an enlarged circular portion 33 of a shank 35 of the member 25, and which has a nut 37 threaded thereon to secure the outer surface of the flattened portion 24 against the face of the enlarged circular portion 33 with a washer 39 surrounding the rod 28 between the net 37 and the inner face of the flattened surface 24. The shank 35 is adapted to be inserted into the head 14 and to be held in place during the method of the present invention as shown in FIG. 1.

As shown in FIG. 5, the plate 20 is a rectangular sheet composed of a smooth hard material, such as a sheet of hardened and polished chromium. The plate is placed on the table 12 when the head is to be aligned in a vertical position, and has an upper face 42 to provide a smooth flat surface to mate with the circular edge or rim 44 defining the mouth 22 of the base 16. It is to be understood that the plate 20 need not be employed if the upper surface of the table 12 is smooth and flat and is cleaned free of debris. Also, it should be understood that in accordance with the present invention, the base 16 may, instead of being provided with a circular rim 44, employ three or more legs having end portions spaced apart equally and arranged in a circle.

In order to position the head 14 of the milling machine 10 in a vertical direction in accordance with the present invention, the shank portion 35 of the base 16 is tightened to the head 14 and the bolts 18 are loosened to free the head to pivot about the point 19. The plate 20 is placed on the table top directly under the base 16 which is fastened to the head 14. The table is then raised until the upper surface of the plate 20 engages the rim 44 of the base 16, causing the head 14 to pivot about the point 19 as the rim 44 sits flat against the plate 20. Thereafter, the bolts 18 are tightened to fix the position of the head 14, and the base 16 is removed therefrom.

As shown in FIG. 6, for the purpose of positioning the head 14 in a predetermined direction at an angle to the vertical direction, a conventional adjustable inclined plate 53 is placed on the table top under the head 14 and has a smooth flat planar surface 55 which can be readily adjusted positionally at an angle relative to the surface of the table top and thus adjusted so that the plane of the surface 55 is normal to the desired direction to be assumed by the head 14. The method of the present invention as previously described is performed in the same manner when it is desired to position the head 14 at an angle to the vertical, except that the head 14 is pivoted to and held in a direction such that the base 16 is facing generally toward the face of the surface 55 as the table 12 is moved upwardly until the rim 44 engages and seats against the surface 55. In this manner, the head 14 can be positioned accurately within a fraction of a degree down to a given number of minutes and seconds.

What is claimed is:

1. A method of positioning an angularly adjustable tool-driving head of a machine having a vertically adjustable workpiece supporting table, said table having a smooth flat surface thereon, comprising:
   providing a base having one end portion terminating in a plane and fastening the other end portion to the head so that the axis of said head is normal to said plane;
   positioning the plane of said surface of said table in a direction normal to the desired predetermined position to be assumed by the head;
   freeing the head for angular adjustment;
   causing relative motion between the base and said surface until they engage one another and said one end portion of the base is seated flat against said surface; and
   subsequently fixing said head in its adjusted position and removing said base from the head.

2. A method according to claim 1, of providing said one end portion of said base with a generally cup-shaped member having a circular rim for seating against said surface.

3. A method according to claim 1, further including providing a plate having said smooth flat surface thereon, positioning said plate on said table with said surface facing said head.

4. A method according to claim 3, of providing said one end portion of said base with a generally cup-shaped member having a circular rim for seating against said surface.

* * * * *